(12) United States Patent
Woo

(10) Patent No.: US 11,955,730 B2
(45) Date of Patent: Apr. 9, 2024

(54) ANTENNA MODULE, METHOD FOR MANUFACTURING ANTENNA MODULE, AND MOBILE TERMINAL

(71) Applicant: LG ELECTRONICS INC., Seoul (KR)

(72) Inventor: Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 470 days.

(21) Appl. No.: 17/309,921

(22) PCT Filed: Jan. 9, 2019

(86) PCT No.: PCT/KR2019/000356
§ 371 (c)(1),
(2) Date: Jun. 30, 2021

(87) PCT Pub. No.: WO2020/145435
PCT Pub. Date: Jul. 16, 2020

(65) Prior Publication Data
US 2022/0077585 A1    Mar. 10, 2022

(51) Int. Cl.
*H01Q 1/24*     (2006.01)
*H01Q 9/04*     (2006.01)
*H04M 1/02*    (2006.01)

(52) U.S. Cl.
CPC .......... *H01Q 9/0407* (2013.01); *H01Q 1/243* (2013.01); *H04M 1/0202* (2013.01)

(58) Field of Classification Search
CPC .............................. H01Q 9/0407; H01Q 1/243
See application file for complete search history.

(56) References Cited

FOREIGN PATENT DOCUMENTS

| KR | 1020110042001 | 4/2011 |
| KR | 1020110049544 | 5/2011 |
| KR | 1020140134452 | 11/2014 |
| KR | 101683679 | 12/2016 |
| KR | 101704801 | 2/2017 |

OTHER PUBLICATIONS

PCT International Application No. PCT/KR2019/000356, International Search Report dated Oct. 8, 2019, 11 pages.

*Primary Examiner* — Graham P Smith
(74) *Attorney, Agent, or Firm* — LEE, HONG, DEGERMAN, KANG & WAIMEY

(57) ABSTRACT

An antenna module comprises: a first radiation patch having a first opening; a second radiation patch spaced apart above the first radiation patch and smaller than the first radiation patch and having a second opening; a coupling patch spaced apart above the second radiation patch and smaller than the second radiation patch; and an electricity feeding path penetrating through the first opening and the second opening so as to be connected to the coupling patch, wherein the center of the first opening and the center of the second opening are displaced laterally. As one antenna module can operate in different frequency bands, the number of antennas can be reduced.

20 Claims, 12 Drawing Sheets

(a)

(b)

(a)

(b)

(a)

(b)

(c)

(a)

(b)

(c)

(d)

ANTENNA MODULE, METHOD FOR MANUFACTURING ANTENNA MODULE, AND MOBILE TERMINAL

CROSS-REFERENCE TO RELATED APPLICATIONS

This application is the National Stage filing under 35 U.S.C. 371 of International Application No. PCT/KR2019/000356, filed on Jan. 9, 2019, the contents of which is hereby incorporated by reference herein in its entirety.

TECHNICAL

The present disclosure relates to an antenna module capable of transmitting and receiving signals of two or more frequency bands, a method for manufacturing the antenna module, and a mobile terminal having the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As the functions of such terminal are expanded, various types of wireless communication are applied to transmit and receive data wirelessly. As the multimedia function expands, it is possible to watch videos with UHD image quality or use virtual reality (VR) contents only through mobile communication, so that there is a need for a technology to transmit and receive larger amounts of data faster.

Accordingly, LTE communication (long term evolution, 4th generation mobile communication) has appeared to transmit larger amounts of data quickly, and the LTE communication has also advanced to a technology with a transmission speed that is twice as great as that of LTE-A, wide area LTE, and the like. In order to increase the transmission speed, two or more frequency bands are used simultaneously or a data transmission amount is increased by increasing a frequency bandwidth. In order to increase a frequency band or to simultaneously use signals of different frequency bands, a scheme of increasing the number of antennas was used.

There is a limit to increasing the bandwidth or using signals of a plurality of bands, so that a 5th generation mobile communication technology has appeared. The 5G technology is not only advantageous for transmitting large amounts of data, but also, has a high response speed unlike the existing 4G mobile communication technology. As a signal of a frequency band higher than that in the 4G mobile communication is used, an antenna of a completely different shape is required.

In order to provide all antennas for the 5G mobile communication in addition to antenna for the 4G mobile communication, a mounting space of the antenna is insufficient. In particular, in the 5G mobile communication, because there is a large difference in the frequency band between standards, an antenna for each frequency is required. Thus, the 5G mobile communication has a problem in that the antenna mounting space is insufficient.

DISCLOSURE

Technical Problem

The present disclosure is to provide an antenna module operating in two or more frequency bands, a method for manufacturing the antenna module, and a mobile terminal having the same.

Technical Solutions

Provided is an antenna module including a first radiation patch having a first opening defined therein, a second radiation patch spaced upwardly apart from the first radiation patch, wherein the second radiation patch is smaller than the first radiation patch and has a second opening defined therein, a coupling patch spaced upwardly apart from the second radiation patch, wherein the coupling patch is smaller than the second radiation patch, and a feeding path connected to the coupling patch through the first opening and the second opening, wherein a center of the first opening and a center of the second opening are displaced in a lateral direction.

The feeding path may include a first path upwardly extending in a vertical direction to the first opening, a second path extending from the first opening through the second opening to the coupling patch, wherein the second path is displaced from the first path, and a connection patch located within the first opening, wherein a bottom surface of the connection path is connected to the first path, and a top surface of the connection path is connected to the second path.

The antenna module may further include a first insulating layer penetrated by the first path, wherein the first radiation patch and the connection patch are positioned on a top surface of the first insulating layer, a second insulating layer stacked on a top surface of the first insulating layer, wherein the second radiation patch is located on one surface of the second insulating layer, and a third insulating layer located on a top surface of the second insulating layer, wherein the coupling patch is located on one surface of the third insulating layer, and the second path may penetrate the second insulating layer and the third insulating layer.

The first path may include a metal layer coated on an inner side surface of a drill hole defined in the first insulating layer, and the connection patch may be connected to the metal layer and covers a top surface of the drill hole.

The second insulating layer may be thicker than the third insulating layer.

The first insulating layer may be thicker than the second insulating layer and the third insulating layer.

The second path may include a via formed by filling metal in a first via hole defined in the second insulating layer and a second via hole defined in the third insulating layer.

The antenna module may further include a fourth insulating layer and a fifth insulating layer formed on a bottom surface of the first insulating layer, the feeding path may further include a third path connected to a bottom surface of the second path and penetrating the fourth insulating layer and the fifth insulating layer, and the antenna module may further include an RF chipset connected to a bottom surface of the third path to apply power to the feeding path.

The first path may be thicker and longer than the second path.

A pair of first openings, a pair of second openings, a pair of coupling patches, and a pair of feeding paths may be included, the pair of first openings may be directed in a vertical direction of the first radiation patch, and the pair of second openings may be directed in a vertical direction of the second radiation patch.

Each unit radiator may include the first radiation patch, the second radiation patch, the coupling patch, and the feeding path, and a plurality of unit radiators may be sequentially arranged in a first direction or arranged in an array form in the first direction and the second direction.

Provided is a method for manufacturing an antenna module including defining a drill hole in a first insulating layer, coating a metal layer on an inner surface of the drill hole and forming a connection patch connected to the metal layer and a first radiation patch including a first opening defined therein surrounding the connection patch on a top surface of the first insulating layer, stacking a second insulating layer on the top surface of the first insulating layer, defining a first via hole penetrating the second insulating layer and connected to the connection patch, forming a first via by filling the first via hole with metal, and forming a second radiation patch on a top surface of the second insulating layer, stacking a third insulating layer on the top surface of the second insulating layer, forming a second via hole penetrating the third insulating layer and connected to the first via, and forming a second via by filling the second via hole with metal and forming a coupling patch on a top surface of the third insulating layer.

The forming of the connection patch may include depositing a metal material on the first insulating layer and etching the metal material to form a ring patch located on an upper periphery of the drill hole together with the metal layer and the first radiation patch, and forming a hole patch for covering a center of the ring patch on a top surface of the drill hole.

The forming of the first via hole and the forming of the second via hole may include defining the first via hole and the second via hole by penetrating the second insulating layer and the third insulating layer using a laser, respectively.

The method may include, before the forming of the first via and the second radiation patch, stacking a fourth insulating layer on a bottom surface of the first insulating layer, and defining a third via hole in the fourth insulating layer, and forming of a third via by filling the third via hole with metal may be performed together with the forming of the first via and the second radiation patch.

Provided is a mobile terminal including a display unit, a housing for mounting the display unit on a front surface thereof, an antenna module integrally formed with the display unit, and a wireless communication unit that controls to transmit and receive a signal through the antenna module, wherein the antenna module includes a first radiation patch having a first opening defined therein, a second radiation patch spaced upwardly apart from the first radiation patch, wherein the second radiation patch is smaller than the first radiation patch and has a second opening defined therein, a coupling patch spaced upwardly apart from the second radiation patch, wherein the coupling patch is smaller than the second radiation patch, and a feeding path connected to the coupling patch through the first opening and the second opening, wherein a center of the first opening and a center of the second opening are displaced in a lateral direction.

The feeding path may include a first path upwardly extending in a vertical direction to the first opening, a second path extending from the first opening through the second opening to the coupling patch, wherein the second path is displaced from the first path, and a connection patch located within the first opening, wherein a bottom surface of the connection path is connected to the first path, and a top surface of the connection path is connected to the second path.

The mobile terminal may further include a first insulating layer penetrated by the first path, wherein the first radiation patch and the connection patch are positioned on a top surface of the first insulating layer, a second insulating layer stacked on a top surface of the first insulating layer, wherein the second radiation patch is located on one surface of the second insulating layer, and a third insulating layer located on a top surface of the second insulating layer, wherein the coupling patch is located on one surface of the third insulating layer, and the second path may penetrate the second insulating layer and the third insulating layer.

The first path may include a metal layer coated on an inner side surface of a drill hole defined in the first insulating layer, and the connection patch may be connected to the metal layer and covers a top surface of the drill hole.

The second path may include a via formed by filling metal in a first via hole defined in the second insulating layer and a second via hole defined in the third insulating layer.

Advantageous Effects

The antenna module of the present disclosure may reduce the number of antennas as one antenna module operates in different frequency bands.

In addition, the antenna module may be implemented through the substrate manufacturing method, so that mass production of the antenna module is possible.

Further scope of applicability of the present disclosure will become apparent from a detailed description below. However, because various changes and modifications within the spirit and scope of the present disclosure may be clearly understood by those skilled in the art, it should be understood that the detailed description and specific embodiments, such as preferred embodiments of the present disclosure, are given by way of example only.

Figure 3:
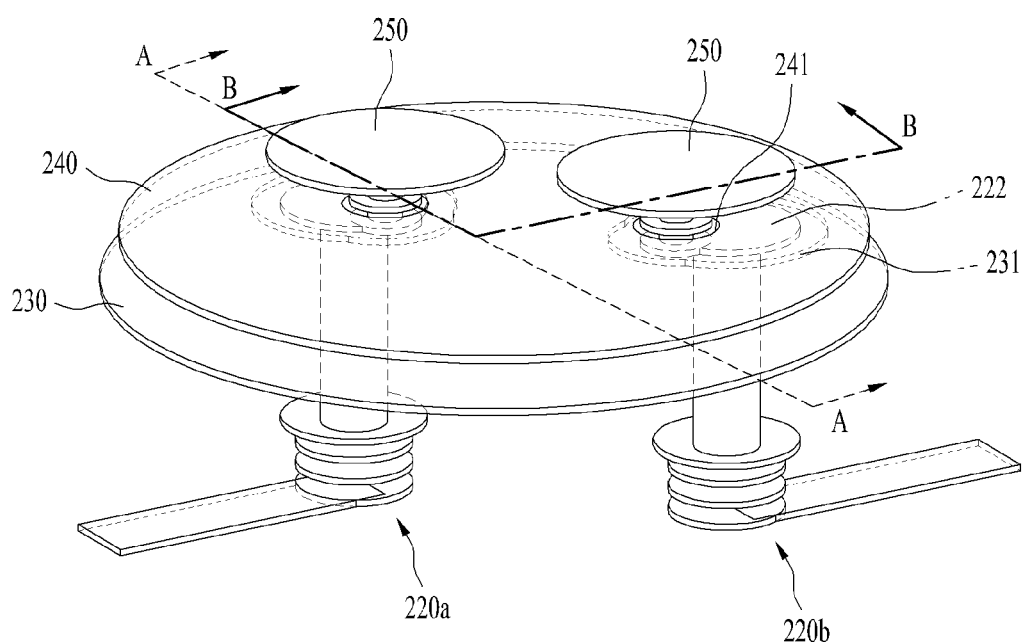
FIG. 3 is a conceptual diagram showing an unit radiator of the present disclosure.
Figure 4:
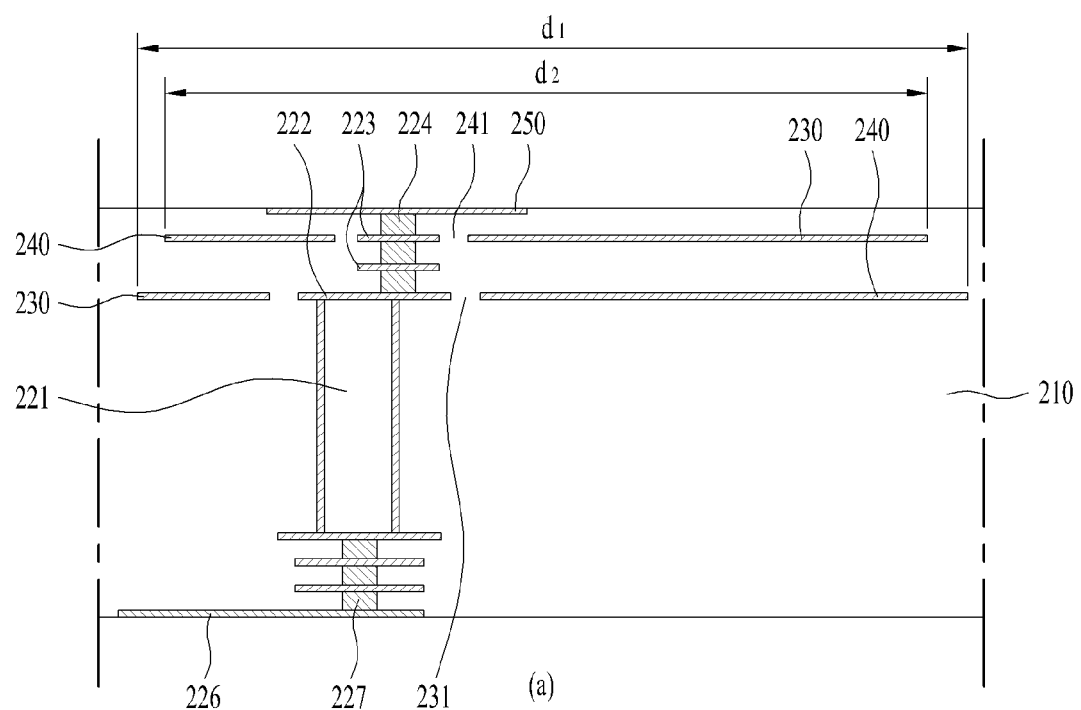
Figure 4:
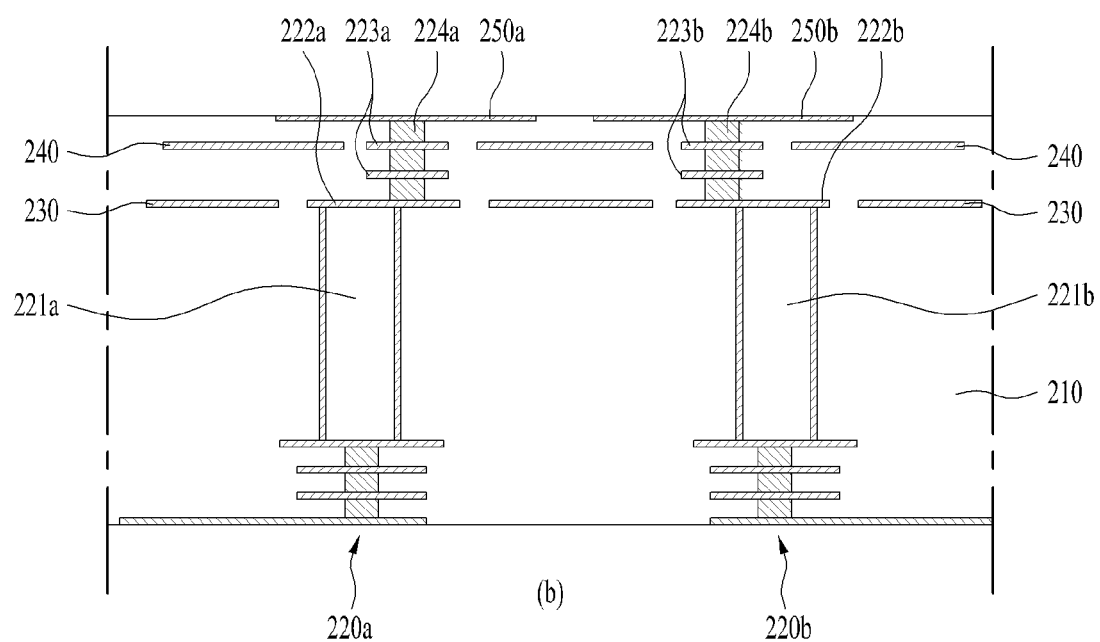

(a) in FIG. 4 is a cross-sectional view taken along a line A-A in FIG. 3.

(b) in FIG. 4 is a cross-sectional view taken along a line B-B in FIG. 3.

Figure 5:
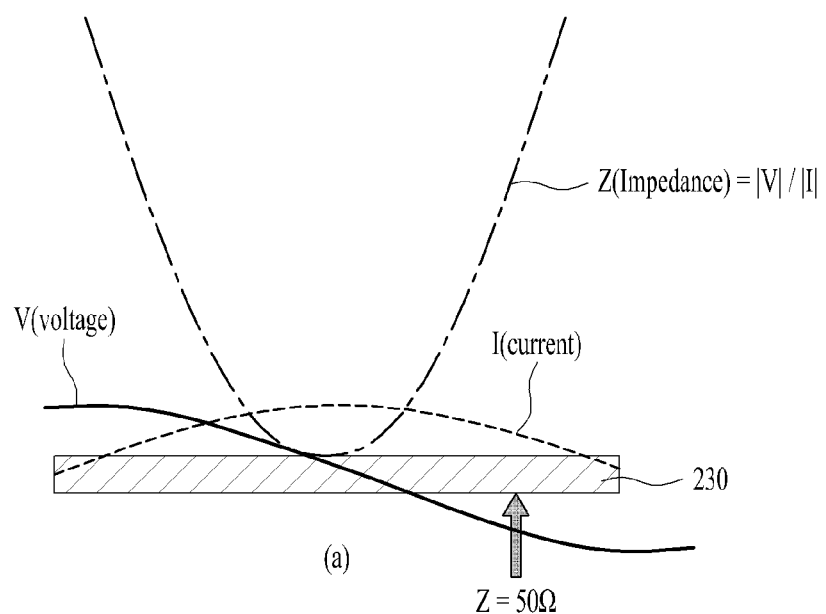
Figure 5:
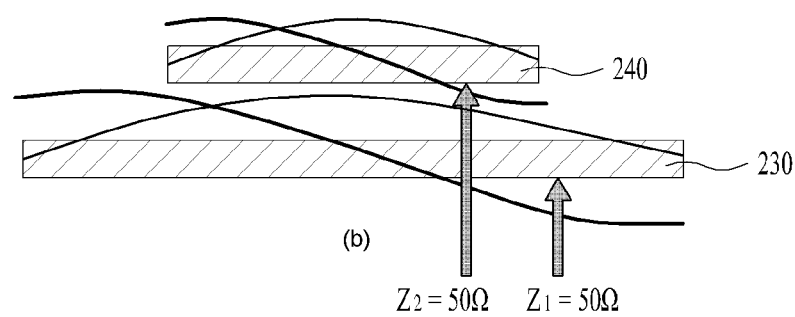

FIG. 5 is a diagram for illustrating a formula for determining a position of a feeding unit connected to a radiation patch.

Figure 6:
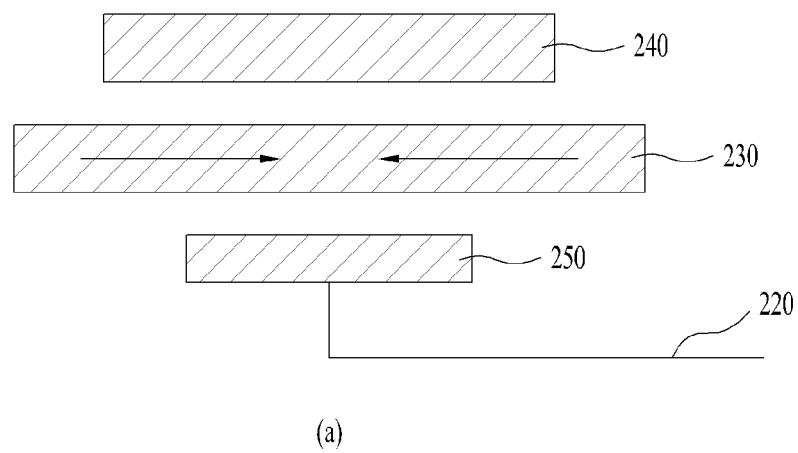
Figure 6:
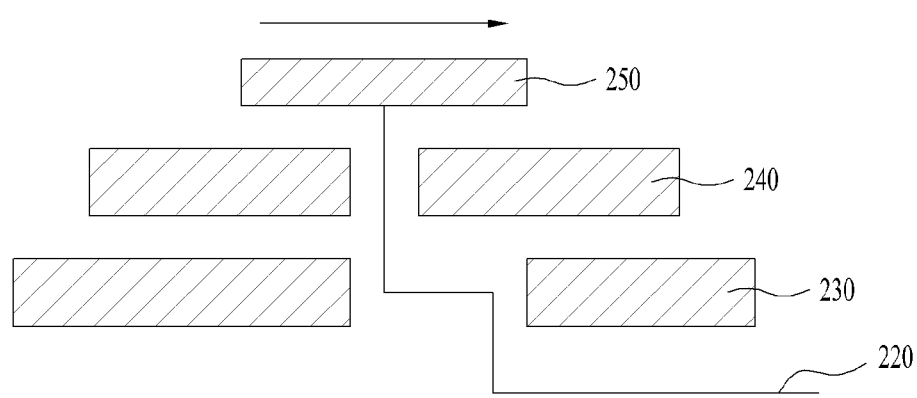

FIG. 6 is a diagram for illustrating a scheme of coupling between patches arranged in a vertical direction.

Figure 7:
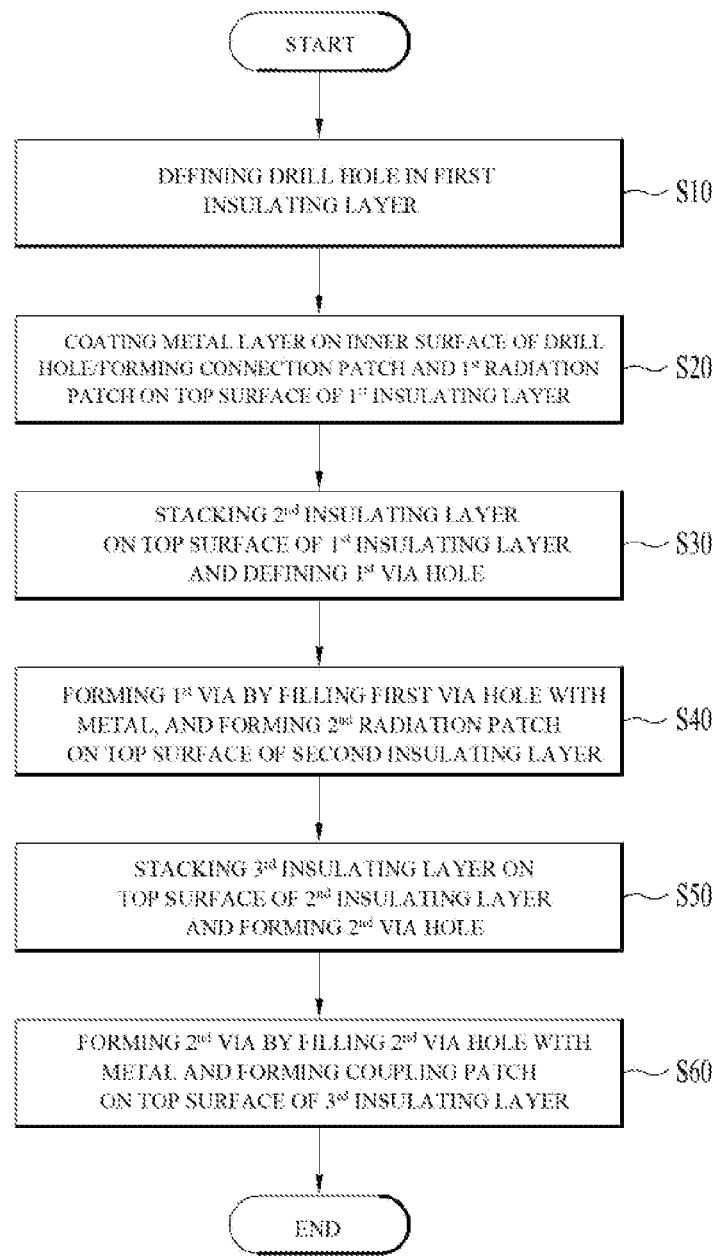

FIG. 7 is a flowchart showing a method for manufacturing an antenna module of the present disclosure.

Figure 8:
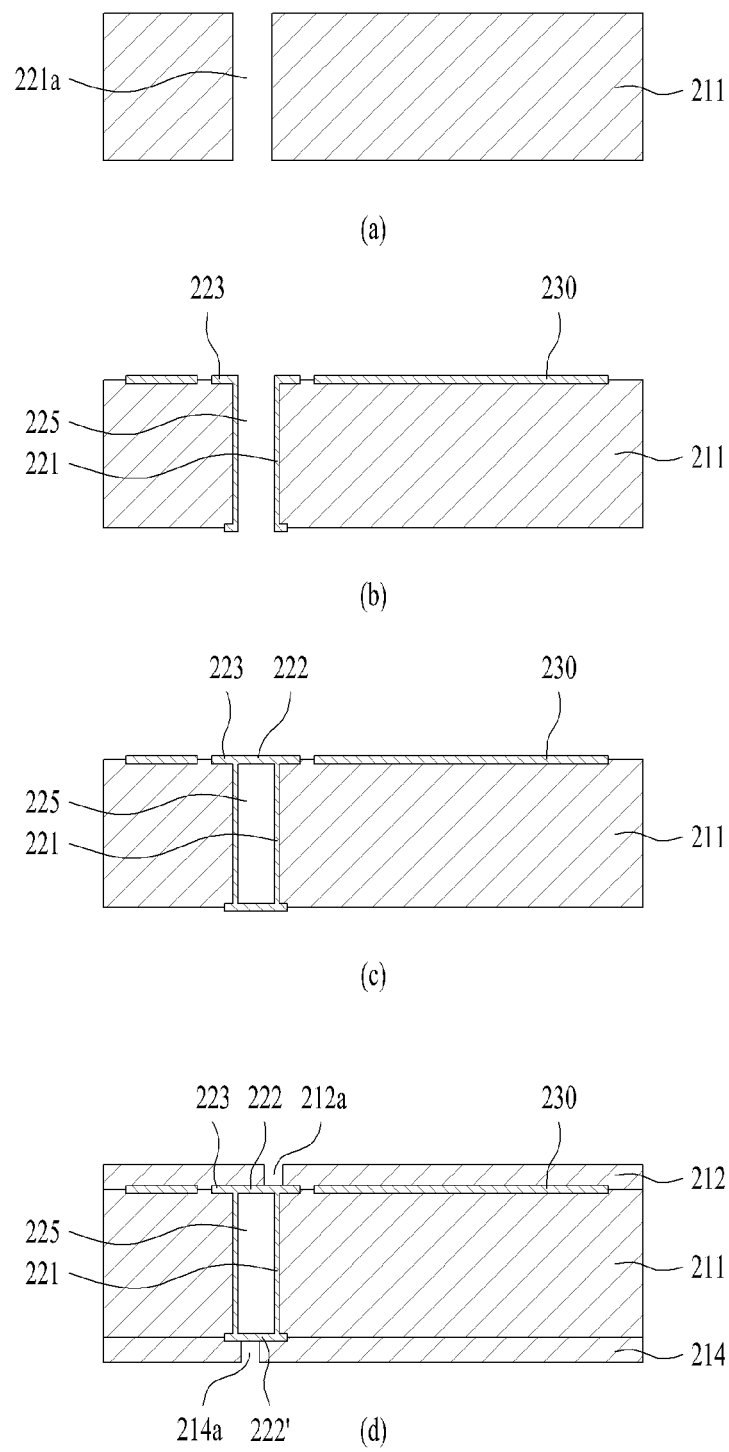
Figure 9:
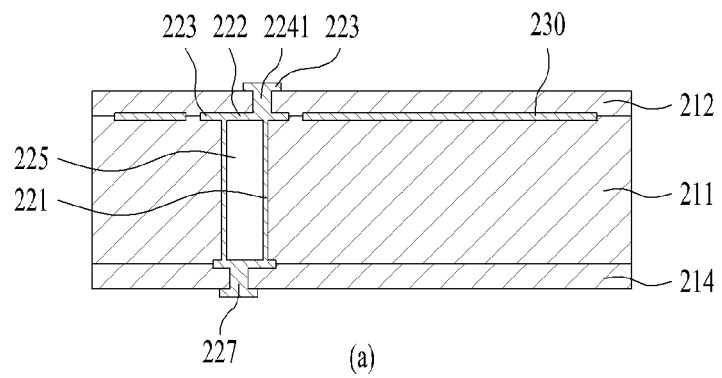
Figure 9:
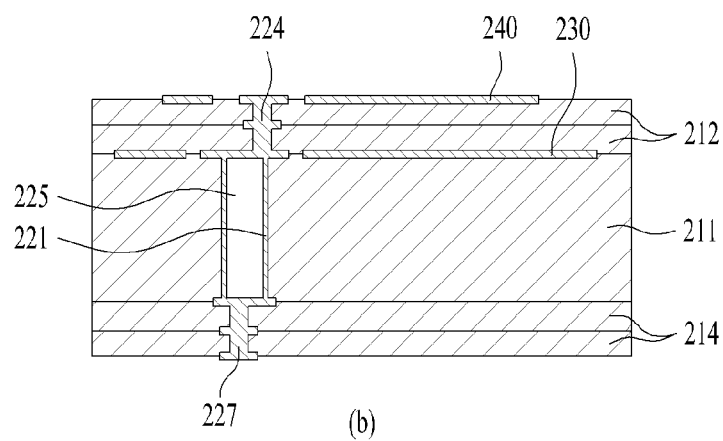
Figure 9:
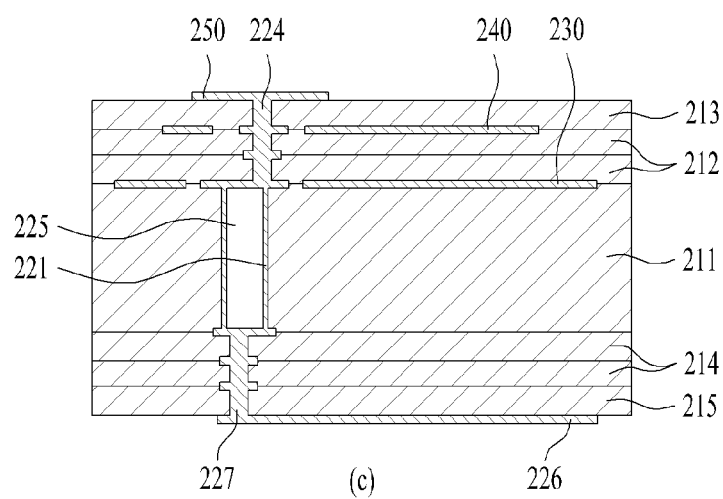

FIGS. 8 and 9 are views showing a method for manufacturing an antenna module of the present disclosure.

Figure 10:
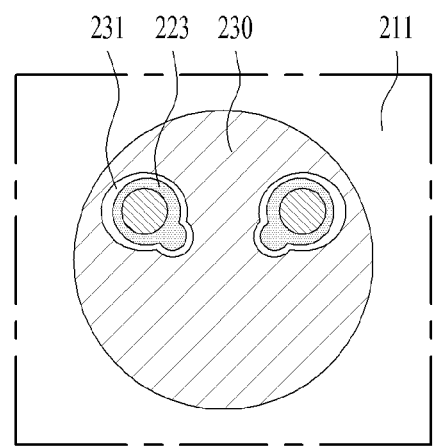
Figure 10:
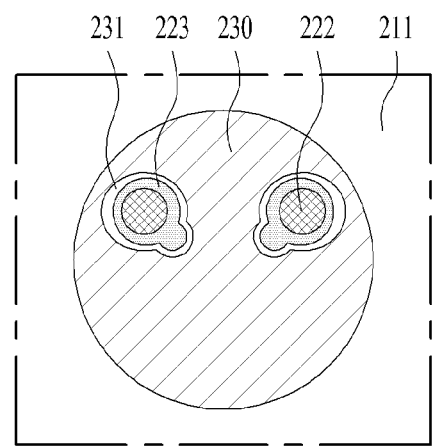
Figure 10:
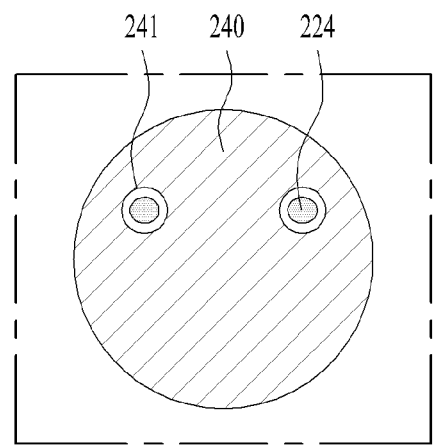
Figure 10:
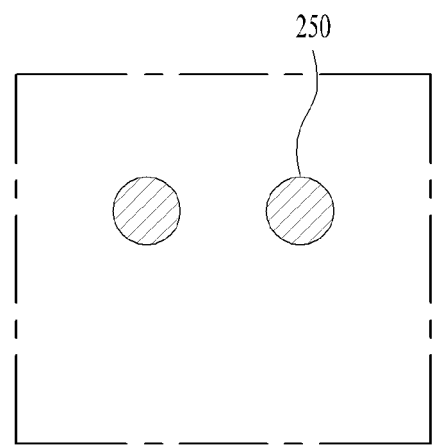

FIG. 10 is a diagram showing a configuration of each layer of an antenna module of the present disclosure.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
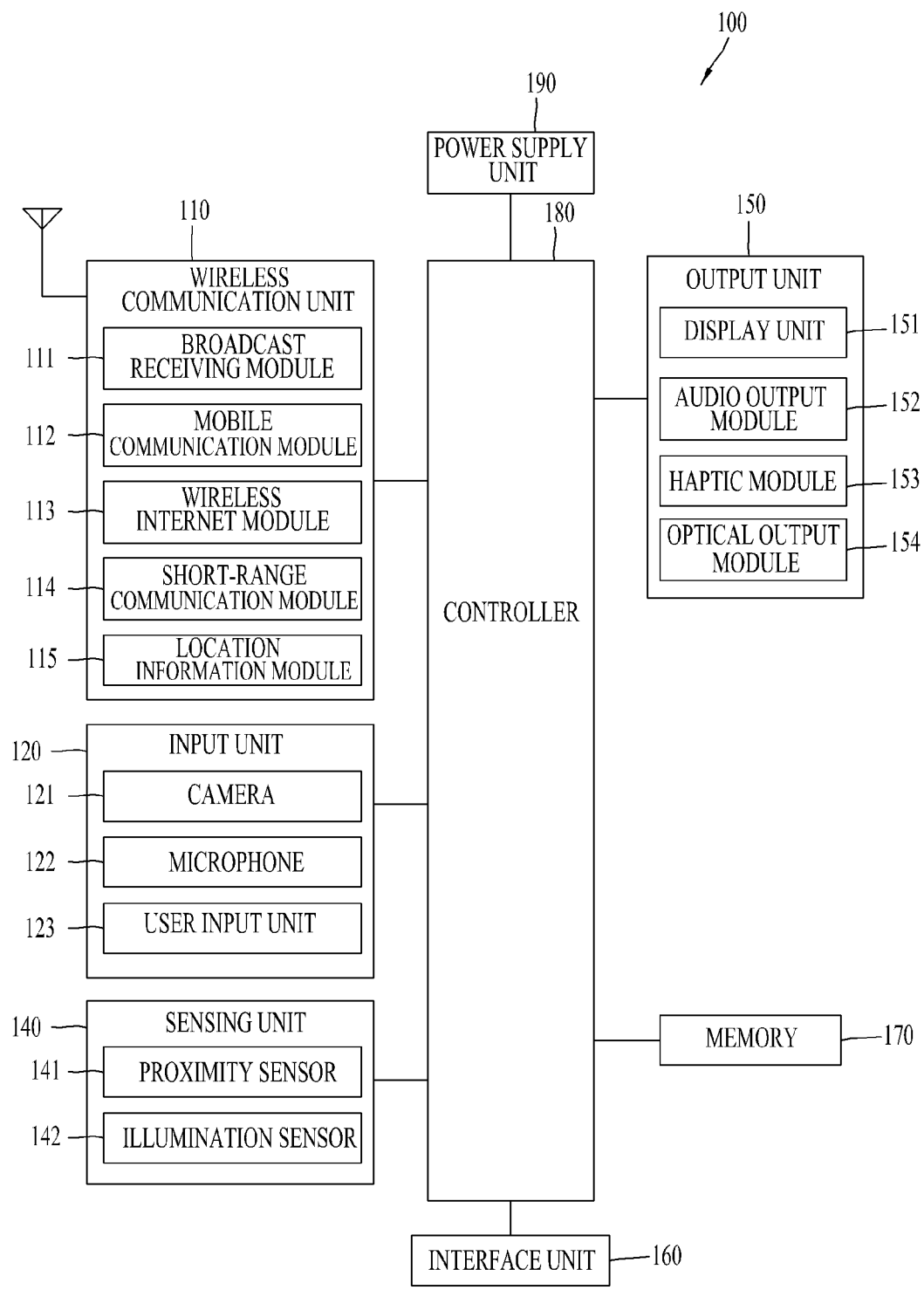
FIG. 1A is a block diagram of a mobile terminal in accordance with the present disclosure.
Figure 1B:
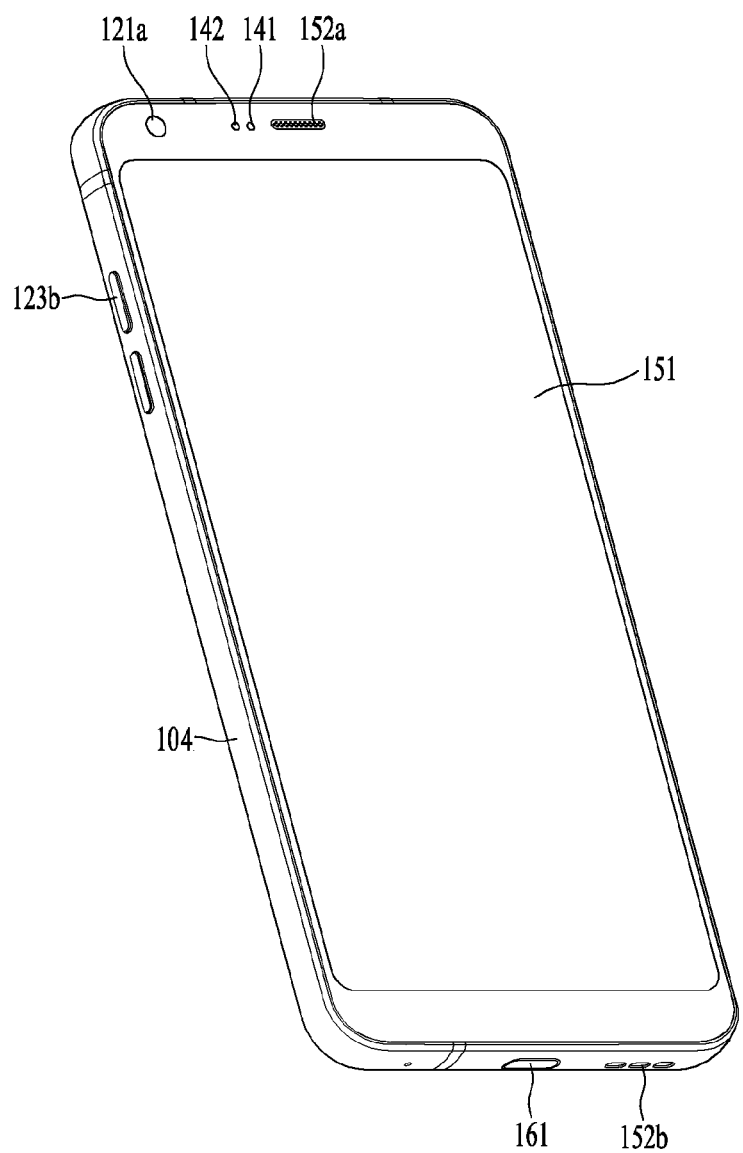
FIGS. 1B and 1C are conceptual views of one example of the mobile terminal, viewed from different directions.
Figure 1C:
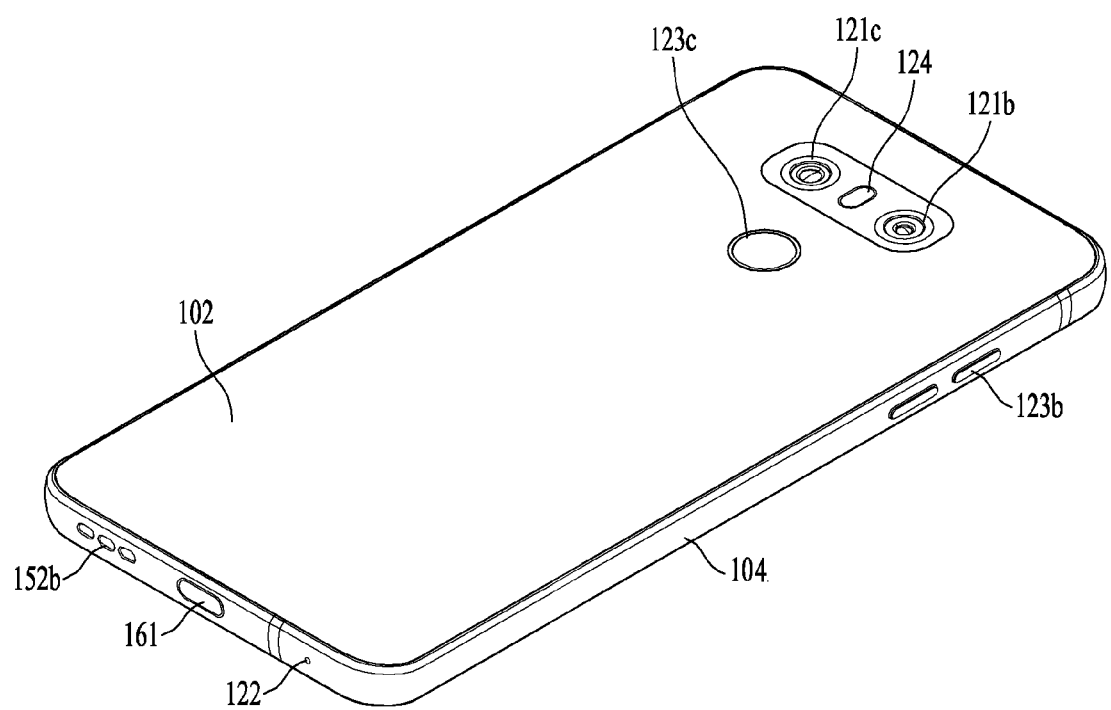

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1A, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

As shown, recently, a mobile terminal having a structure in which a window 151a located on a front surface of the display unit covers an entire front surface, and thus, the front case is omitted has been released. Such mobile terminal may have a side case 104 in a form of surrounding a perimeter of the side surface. The window 151a, the side case 104, and the rear case 102 may define an internal space. In some cases, electronic parts may be mounted on the rear case 102 as well. Examples of such electronic components include a detachable battery 191, an identification module, a memory card, and the like. Rear cover is shown covering the electronic components, and this cover may be detachably coupled to the rear case 102. Therefore, when the rear cover is detached from the rear case 102, the electronic components mounted to the rear case 102 are externally exposed.

The cases 102, 104 may be formed by injection-molding synthetic resin or may be formed of a metal, for example, stainless steel (STS), aluminum (Al), titanium (Ti), or the like.

The side case 104 of the present disclosure may contain a metal material, and the side case 104 may be used as an antenna radiator. It is necessary to use a conductive material with a length suitable for frequency characteristics of a signal that is transmitted and received. Thus, a plurality of conductive members may be formed by dividing the metal side case 104 with a slit defined in the middle, and the conductive member may be used as the antenna radiator by filling the slit with a non-metallic material.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first and second audio output modules 152a and 152b, the proximity sensor 141, the illuminance sensor 142, the optical output module 154, the first and second cameras 121a and 121b, the first and second manipulation units 123a and 123b, the microphone 122 and the interface unit 160.

It will be described for the mobile terminal as shown in FIGS. 1B and 1C. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A). may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen Further preferred embodiments will be described in more detail with reference to additional drawing figures. It is understood by those skilled in the art that the present features can be embodied in several forms without departing from the characteristics thereof.

As the multimedia function became important, a wireless communication technology performed in the mobile terminal 100 is implemented in various forms, such as a short-distance, a long-distance, or between devices. In this case, because frequency bands (resonant frequencies) used are different, different antennas must be used.

Large amounts of data is transmitted and received. To support this, an LTE (4th generation mobile communication), which is a 4th generation mobile communication technology, has appeared. However, considering a trend of data consumption by wireless network users and widespread use of Internet of Things, there is a need for an ultra-wideband mobile communication technology that may transmit and receive the large amounts of data faster than the LTE. Thus, a 5G mobile communication technology is being developed. A wireless technology for the 5th generation (5G) mobile communication is referred to as a new radio (NR) in the 3rd generation partnership project (3GPP), and as an international mobile telecommunication (IMT)-2020 in an international telecommunications union (ITU), and is a communication scheme implemented differently from the existing LTE.

Through the 5G mobile communication, in addition to transmitting the large amounts of data quickly, reliability of data transmission may be improved and a function of supporting an Internet of Things (IOT) may be added as the Internet of Things (IOT) is popularized.

The 5G is a mobile communication technology with a maximum download speed of 20 Gbps and a minimum download speed of 100 Mbps. In addition, the 5G may provide an Internet of Things (IoT) service to 1 million devices within a radius of 1 km$^2$, and free communication may be achieved even on a high-speed train at a speed of 500 km per hour. A download speed is 280 times higher than that of the general LTE. It is a wireless communication technology with a speed capable of downloading a 1 GB movie in 10 seconds.

The 5G mobile communication has noticeably improved in a response speed as well as a transmission speed. When the data transmission speed is an indicator of how much data may pass at one time, then the response speed measures a time it takes for small data to pass.

In the 4G, the response speed was increased to be in a range from 10 to 50 ms (milliseconds, thousandths of a second). In the 5G, this response speed will be about 10 times higher. Thanks to this, the 5G is expected to be actively introduced in fields of an autonomous vehicle and the Internet of Things (IoT), where large amounts of data must be seamlessly exchanged with a central server.

Frequency bands of centimeter wave (3 GHz-30 GHz) and millimeter wave (30 GHz-300 GHz) may be used. A communication scheme using a signal of a frequency band equal to or lower than 6 GHz among the centimeter waves is referred to as Sub-6.

The Sub-6 includes N41 using a signal band equal to or higher than 2.5 GHz and equal to or lower than 2.7 GHz and N78 using a signal band equal to or higher than 3.3 GHz and equal to or lower than 3.8 GHz, and the frequency band used may differ between countries. An antenna that secures performance in both frequency bands is required for a product with specifications that may be used worldwide.

Because the millimeter wave uses a signal of a frequency band higher than that of the centimeter wave, an array antenna having directionality may be used to transmit a signal farther away. As an antenna used for conventional mobile communication, an antenna having a radiation pattern in which electromagnetic waves are radiated while spreading without directionality, such as a dipole antenna or a monopole antenna, was used. The millimeter wave also has a problem in that a gain is low as a lot of energy is consumed for the transmission in such manner. When a transmitting end forms a beam that is emitted toward a receiving end using the array antenna, the mobile communication is possible with less energy.

A sharp beam may be implemented by combining beam patterns of antennas using a plurality of radiation patches. An array antenna 200 using the plurality of radiation patches makes the beam sharper so that a signal may be transmitted further in a specific direction. A direction of the beam may be adjusted by adjusting a phase of power supplied to the plurality of radiation patches.

The 5G mobile communication technology may use different frequency bands based on countries and mobile carriers. Because a conventional mobile communication technology uses a low frequency band, a spacing between frequencies of the mobile carriers or the countries was small. However, for the millimeter waves, the difference is large. For example, the frequency bands, such as 28 GHz and 39 GHz, may differ by 10 GHz or greater.

As an existing LTE antenna was improved several times, a structure of the antenna became complicated. For broadband LTE, an antenna structure that may extend a bandwidth at a resonant frequency is required. For LTE-Advanced (LTE-A) using signals of several frequency bands instead of one frequency band, a plurality of antennas capable of receiving the signals of the different frequency bands or antennas performing multi-resonance are required.

It is necessary to have a plurality of antennas to cover all signals such as a signal of a frequency band equal to or lower than 1 GHz (a low frequency band: a low band), a signal of frequency band around 2 GHz (a mid frequency band: a mid band), a signal of a frequency band equal to or higher than 2.2 GHz (a high frequency band: a high band), and the like.

In addition, the plurality of antennas are required to apply a multiple input multiple output (MIMO) technology. The multiple input multiple output scheme has two or more antennas in a base station and a mobile terminal to transmit data through multiple paths and a receiving end detects the data, so that interference is reduced and a transmission speed of each antenna is lowered, thereby transmitting as many data as the number of antennas. In case of using a 4×4 MIMO scheme for the LTE mobile communication, 4 antennas are required, so the antenna may be implemented using a side case containing a metal material. In order to use the MIMO scheme, because multiple antennas are required, a slit that divides a metallic portion of the side case may be defined to divide the side case into a plurality of conductors, and each conductor may be used as the antenna.

However, there is a limit to a change in a size or a length of the side case exposed to the outside in terms of design, and there is a problem that a frequency tuning of the signal to be transmitted and received is not easy because of an opening, a button, or the like located on a side surface. Thus, the length of the side case may be increased by connecting a conductive pattern inside the case or coupled to the case, or the frequency may be tuned using a device.

Because the side surface of the side case is a portion to be in contact with a user's hand during use of the mobile terminal, it is placed at upper and lower portions as much as possible. In addition, because increasing the number of slits is limited in terms of the design, there is a limit to additionally implementing the antenna using the side case. As described above, there is a problem in that the number of antennas increases because the millimeter wave must have the antenna operating in the plurality of frequency bands.

Figure 2:
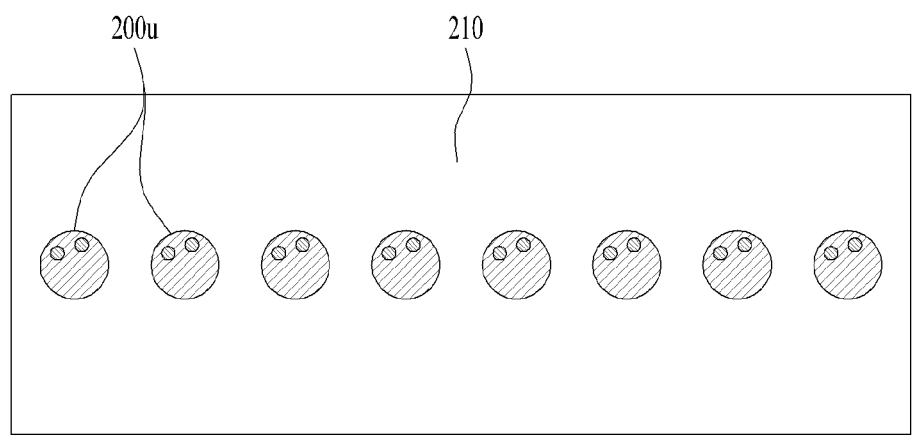
FIG. 2 is a view showing an antenna module of the present disclosure.
Figure 2:
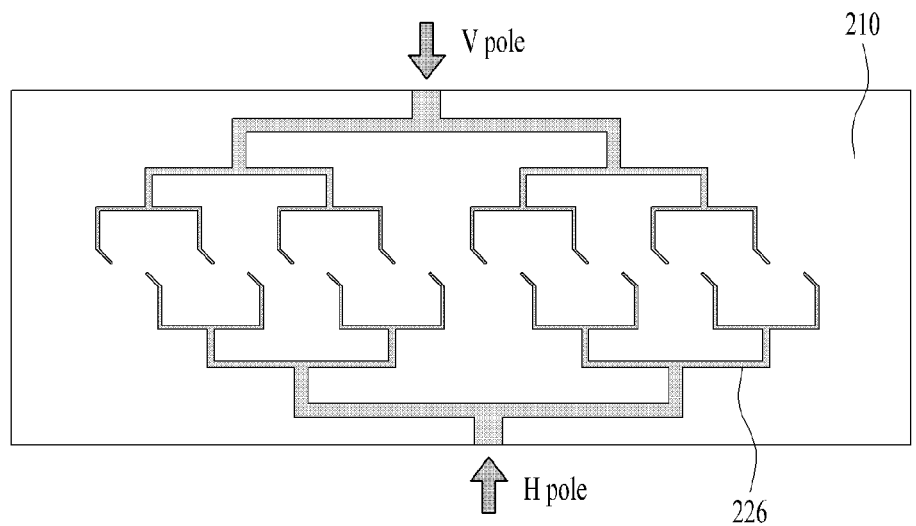

The present disclosure provides an antenna module 200 operating in the plurality of frequency bands to solve the above problem. FIG. 2 is a view showing the antenna module 200 of the present disclosure. (a) in FIG. 2 shows one surface of the antenna module 200, and (b) shows the other surface thereof. The antenna module 200 has a form in which a plurality of unit radiators 200*u* are arranged in a line on one surface of an insulating substrate 210. Each unit radiator 200*u* may penetrate the insulating substrate 210 and be connected to a RF chipset on the other surface of the substrate 210 to radiate a signal.

FIG. 3 is a conceptual diagram showing the unit radiator 200*u* of the present disclosure, and FIG. 4 is a cross-sectional view of FIG. 3. The unit radiator 200*u* of the present disclosure includes a plurality of radiation patches 230 and 240 overlapping in a z-axis direction. Although the present embodiment shows an embodiment including a pair of radiation patches 230 and 240, more radiation patches may be overlapped when necessary.

A first radiation patch 230 and a second radiation patch 240 positioned above the first radiation patch 230 are included. The second radiation patch 240 may be formed to have a smaller size than the first radiation patch 230. When the first radiation patch 230 is smaller than the second radiation patch 240, the first radiation patch 230 is obscured by the second radiation patch 240 and thus is not able to transmit the signal. Thus, the first radiation patch 230 positioned at a lower vertical level may be larger than the second radiation patch 240 positioned at a higher vertical level. A concept of the higher and lower vertical levels of the antenna module is not a concept of higher and lower vertical levels in a gravitational direction. A patch disposed on a side from which the signal is radiated is referred to as being at the higher vertical level, and a patch disposed on an opposite side thereof is referred to as being at the lower vertical level.

A feeding path 220 penetrating the first radiation patch 230 and the second radiation patch 240 is connected to a coupling patch 250 spaced upwardly apart from the second radiation patch 240. The coupling patch 250 forms an electromagnetic field by power supplied through the feeding path 220, and the second radiation patch 240 emits the signal by being affected by a current flow of the coupling patch 250. Such feeding scheme is referred to as indirect feeding or coupling feeding.

As shown in FIG. 3, the present disclosure may be provided with a plurality of feeding paths 220 and a plurality of coupling patches 250 in one unit radiator 200u. This is for implementing polarized waves in two directions. The two feeding paths 220 are directed in directions perpendicular to centers of a first radiator and a second radiator, respectively. That is, when power is applied through a first feeding path 220, current flows in a first direction to form a horizontal polarized wave. When power is applied through a second feeding path 220, current flows in a second direction perpendicular to the first direction, forming a vertical polarized wave.

Because a diameter d1 of the first radiation patch 230 is greater than a diameter d2 of the second radiation patch 240, a first signal transmitted and received by the first radiation patch 230 operates at a lower frequency than a second signal transmitted and received by the second radiation patch 240.

For example, the first radiation patch 230 may transmit and receive a signal of 28 GHz and the second radiation patch 240 may transmit and receive a signal of 39 GHz. A diameter of each radiation patch corresponds to ½ a wavelength of a transmitted and received signal. In this connection, the wavelength means an effective wavelength reflecting a dielectric constant of the insulating substrate 210 on which the first radiation patch 230 and the second radiation patch 240 are formed.

FIG. 3 is a view omitting the insulating substrate 210 on which the first radiation patch 230, the second radiation patch 240, the coupling patch 250, and the feeding path 220 are formed. However, the actual component described above is formed by defining a hole in an insulating substrate and depositing a conductive material on a surface of an insulating layer using a deposition etching scheme.

(a) in FIG. 4, which is a cross-sectional view taken along a line A-A in FIG. 3, is a cross-sectional view showing only one feeding path 220. (b) in FIG. 4, which is a cross-sectional view taken along a line B-B in FIG. 3, is a cross-sectional view showing the two feeding paths 220.

The feeding path 220 penetrating the insulating substrate 210 in a vertical direction has a bent shape as shown in (a) in FIG. 4, and includes a connection patch 222 that connects a first path 221 positioned at a lower vertical level with a second path 224 positioned at a higher vertical level. Openings may be defined in the first radiation patch 230 and the second radiation patch 240 to allow the feeding path 220 to pass therethrough. A first opening 231 defined in the first radiation patch 230 may be larger than a second opening defined in the second radiation patch 240. In order to dispose the connection patch 222 in the first opening 231, the first opening 231 may be defined to be larger.

The reason the first path 221 and the second path 224 are displaced in a horizontal direction in the feeding path 220 as such is that the sizes of the first radiation patch 230 and the second radiation patch 240 are different. FIG. 5 is a diagram for illustrating a formula for determining a position of a feeding unit connected to a radiation patch.

When power is applied to the radiation patch, a voltage and a current have different values depending on a location of the radiation patch as shown in (a) in FIG. 5. Because a length of the radiation patch corresponds to ½ of a wavelength of the signal, waves of the voltage and the current oscillate with waveforms corresponding to a ½ magnitude. As such, because the voltage and the current change based on the location of the radiation patch, an impedance also changes. In order for the antenna to operate, the power must be supplied to have an impedance value of a predetermined magnitude. For example, in a case of an antenna operating at 50Ω, it should be connected to the feeding path 220 at a location with the impedance of 50Ω.

Although the coupling patch 250 and the feeding path 220 are not directly connected to each other using the coupling scheme in the present disclosure, locations of the coupling patch 250 and the feeding path 220 are important for impedance matching. Because the sizes of the first radiation patch 230 and the second radiation patch 240 are different as shown in (b) in FIG. 5, a feeding location of the first radiation patch 230 and a feeding location of the second radiation patch 240 do not coincide in the vertical direction. When the second radiation patch 240 is biased toward one side of the first radiation patch 230, there is a problem that the radiation is not performed properly on the first radiation patch 230. Therefore, as shown in FIG. 4, by displacing the first path 221 and the second path 224 of the feeding path 220 misaligned, it may be designed that the feeding path 220 passes optimal feeding locations in the first radiation patch 230 and the second radiation patch 240.

When the second signal is supplied from the RF chipset, the coupling patch 250 and the second radiation patch 240 are coupled to each other, so that the second signal may be transmitted and received from the second radiation patch 240. When the first signal is supplied, current flows through the coupling patch 250 and the second radiation patch 240 to the first radiation patch 230 to transmit and receive the first signal.

FIG. 6 is a diagram for illustrating a scheme of coupling between patches arranged in a vertical direction. The coupling patch 250 is located above the second radiation patch 240. When the patch connected to the feeding path 220 is located at a lower vertical level as shown in (a) in FIG. 6, coupling with the first radiation patch 230 is not a big problem, but coupling of the second radiation patch 240 positioned above is not properly performed. Because the size of the first radiation patch 230 is larger than that of the second radiation patch 240, a flow of current flowing on the second radiation patch 240 becomes irregular, so that it does not operate at a specific impedance, but an unspecified impedance is generated.

When the coupling patch 250 is positioned at a higher vertical level as shown in (b) in FIG. 6, because the second radiation patch 240 is smaller than the first radiation patch 230, it may operate at the specific impedance, so that the coupling patch 250 may be placed on top.

FIG. 7 is a flowchart showing a method for manufacturing the antenna module 200 of the present disclosure, FIGS. 8 and 9 are views showing a method for manufacturing the antenna module 200 of the present disclosure, and FIG. 10 is a diagram showing a configuration of each layer of the antenna module 200 of the present disclosure.

First, a first insulating layer 211 is prepared, and a drill hole 225 is defined in the first insulating layer 211 (S10). The radiation patch may be separated from the ground using a great thickness of the first insulating layer 211. The first insulating layer 211 is thicker than each layer of a conventional printed circuit board, so that it is difficult to define the hole with a laser scheme. The hole may be defined using a drill (see (a) in FIG. 8). When the hole is defined in the first insulating layer 211 using a drill, a size of the hole is larger than that of the hole defined by the laser.

Next, a metal layer 221 may be formed on the first radiation patch 230 and on an inner side surface of the drill hole 225 by being deposited on the first insulating layer 211 to plate metal, and by etching the metal to remove unnecessary metal (S20). The first radiation patch 230 is located on a top surface of the first insulating layer 211 and a first opening 231 is defined at a position corresponding to the drill hole 225.

Because a size of the drill hole 225 is large, the metal layer 221 is formed on the inner side surface of the drill hole 225 without fully filling the drill hole 225 with the metal. A via patch 223 may be formed by leaving some metal around a top surface of the drill hole 225. The via patch 223 is a component for electrically connecting a first via 2241 formed in a second insulating layer 212 stacked on a top surface of the first insulating layer 211 with the metal layer 221 of the drill hole 225, and is located in the first opening 231. (a) in FIG. 10 is a view after the S20 process is finished. Because the drill hole 225 is large, the top surface thereof may be opened as shown in (a) in FIG. 10.

Next, the second insulating layer 212 is stacked on the top surface of the first insulating layer 211, and a first via hole 212a is defined in the second insulating layer 212 (S30). The second insulating layer 212 covers the first radiation patch 230 formed on the top surface of the first insulating layer 211, the via patch 223, and the drill hole, and the via hole is defined in the second insulating layer 212 to form a via connected to the metal layer of the drill hole 225. Because the second insulating layer 212 is thinner than the first insulating layer 211, the first via hole 212a may be defined using the laser rather than the drill. A small first via hole 212a may be defined using the laser. In the deposition etching process for forming the second radiation patch 240, metal may be filled in the first via hole 212a to form a first via 2241 (S40).

Laser etching is a scheme that uses the laser to define the hole in the insulating layer. Because the laser is light, it is not able to penetrate a metal material. Therefore, the metal material should be positioned at an end of the first via hole 212a to define the hole only in the second insulating layer 212 and not damage the first insulating layer 211.

In order to define the first via hole 212a with the laser etching, the metal material should be applied to a lower end of the first via hole 212a, that is, a portion where the first via hole 212a of the top surface of the first insulating layer 211 is located. When the via patch 223 and the first via hole 212a located on a periphery of the drill hole 225 overlap, the laser etching is possible. However, when the drill hole 225 and the first via 2241 at least partially overlap, the first via hole 212a is not able to be defined.

Thus, in the present embodiment, as shown in (b) in FIG. 8, the connection patch 222 is formed together with the via patch 223 by covering the top surface of the drill hole 225 with the metal material. In order to form the metal layer on the surface of the opening as described above, a via in pad plated over (VIPPO) method may be used. Using the VIPPO method, the metal may be applied to the top surface of the drill hole 225, which has no bottom surface, as shown in (b) in FIG. 8, and the drill hole 225 may be covered as shown in (b) in FIG. 10.

The connection patch 222 covered up to the drill hole 225 is located between the first path 221 and the second path 224 to connect the first path 221 and the second path 224 that are not arranged in a row in the vertical direction with each other. The connection patch 222 may be formed on the same layer as the first radiation patch 230, and the first opening 231 of the first radiation patch 230 may be defined large so as not to overlap the connection patch 222.

Because the first radiation patch 230 and the second radiation patch 240 are larger than the coupling patch 250, a plurality of insulating layers may be stacked when forming the first via 2241 as shown in (a) and (b) in FIG. 9 such that a spacing between the two radiation patches is larger than the coupling patch 250. When the first via 2241 is formed, the second radiation patch 240 may be formed on a top surface of the second insulating layer 212. The second radiation patch 240 may include a second opening 241 that do not overlap the first via 2241. Because the first via 2241 is smaller than the connection patch 222, the second opening 241 may be defined to be smaller than the first opening 231 (see (c) in FIG. 10). A via patch 223 having a diameter larger than the diameter of the first via 2241 may be formed on a top surface of the first via 2241 to have a wider surface for forming the second via 2242.

A third insulating layer 213 may be stacked on the top surface of the second insulating layer 212 to define a second via hole (S50). The second via hole in the third insulating layer 213 may be filled with metal to form a second via 2242, and a coupling patch 250 that covers the second via 2242 may be formed (S60). When the coupling patch 250 is located at the top end and power is applied through the feeding path 220 as shown in (d) in FIG. 9 and (d) in FIG. 10, a current may flow on the coupling patch 250, and a signal may be transmitted/received through the second radiation patch 240 or the first radiation patch 230.

The deposition and the etching of the metal material does not occur on one surface of the insulating substrate 210, but occurs on both surfaces thereof at the same time, so that, as shown in FIG. 9, a fourth insulating layer 214 and a fifth insulating layer 215 may be formed on a bottom surface of the first insulating layer 211 symmetrically to the second insulating layer 212 and the third insulating layer 213, and the feeding path 220 may further include a third path 227 penetrating the fourth insulating layer and the fifth insulating layer.

The feeding path 220 may be composed of the third path, the first path 221, the connection patch 222, and the second path. The third path 227 may be exposed on a bottom surface of the fifth insulating layer 215, and a feeding line 226 that connects the third path 227 with the feeding unit may be formed on the bottom surface of the fifth insulating layer.

The antenna module 200 of the present disclosure described above may reduce the number of antennas as one antenna module 200 operates in the different frequency bands.

In addition, the antenna module 200 may be implemented through the substrate manufacturing method, so that the mass production of the antenna module 200 is possible.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. An antenna module comprising:
   a first radiation patch having a first opening defined therein;
   a second radiation patch spaced upwardly apart from the first radiation patch, wherein the second radiation patch is smaller than the first radiation patch and has a second opening defined therein;
   a coupling patch spaced upwardly apart from the second radiation patch, wherein the coupling patch is smaller than the second radiation patch; and
   a feeding path connected to the coupling patch through the first opening and the second opening,
   wherein a center of the first opening and a center of the second opening are displaced in a lateral direction.

2. The antenna module of claim 1, wherein the feeding path includes:
   a first path upwardly extending in a vertical direction to the first opening;
   a second path extending from the first opening through the second opening to the coupling patch, wherein the second path is displaced from the first path; and
   a connection patch located within the first opening, wherein a bottom surface of the connection patch is connected to the first path, and a top surface of the connection path is connected to the second path.

3. The antenna module of claim 2, further comprising:
   a first insulating layer penetrated by the first path, wherein the first radiation patch and the connection patch are positioned on a top surface of the first insulating layer;
   a second insulating layer stacked on a top surface of the first insulating layer, wherein the second radiation patch is located on one surface of the second insulating layer; and
   a third insulating layer located on a top surface of the second insulating layer, wherein the coupling patch is located on one surface of the third insulating layer,
   wherein the second path penetrates the second insulating layer and the third insulating layer.

4. The antenna module of claim 3, wherein the first path includes a metal layer coated on an inner side surface of a drill hole defined in the first insulating layer,
   wherein the connection patch is connected to the metal layer and covers a top surface of the drill hole.

5. The antenna module of claim 3, wherein the second insulating layer is thicker than the third insulating layer.

6. The antenna module of claim 3, wherein the first insulating layer is thicker than the second insulating layer and the third insulating layer.

7. The antenna module of claim 3, wherein the second path includes a via formed by filling metal in a first via hole defined in the second insulating layer and a second via hole defined in the third insulating layer.

8. The antenna module of claim 3, further comprising a fourth insulating layer and a fifth insulating layer formed on a bottom surface of the first insulating layer,
   wherein the feeding path further includes a third path connected to a bottom surface of the second path and penetrating the fourth insulating layer and the fifth insulating layer,
   wherein the antenna module further includes an RF chipset connected to a bottom surface of the third path to apply power to the feeding path.

9. The antenna module of claim 3, wherein the first path is thicker and longer than the second path.

10. The antenna module of claim 1, wherein a pair of first openings, a pair of second openings, a pair of coupling patches, and a pair of feeding paths are included,
    wherein the pair of first openings are directed in a vertical direction of the first radiation patch,
    wherein the pair of second openings are directed in a vertical direction of the second radiation patch.

11. The antenna module of claim 1, wherein each unit radiator includes the first radiation patch, the second radiation patch, the coupling patch, and the feeding path, wherein a plurality of unit radiators are sequentially arranged in a first direction or arranged in an array form in the first direction and the second direction.

12. A method for manufacturing an antenna module, the method comprising:
    defining a drill hole in a first insulating layer;
    coating a metal layer on an inner surface of the drill hole and forming a connection patch connected to the metal layer and a first radiation patch including a first opening defined therein surrounding the connection patch on a top surface of the first insulating layer;
    stacking a second insulating layer on the top surface of the first insulating layer;
    defining a first via hole penetrating the second insulating layer and connected to the connection patch;
    forming a first via by filling the first via hole with metal, and forming a second radiation patch on a top surface of the second insulating layer;
    stacking a third insulating layer on the top surface of the second insulating layer;
    forming a second via hole penetrating the third insulating layer and connected to the first via; and
    forming a second via by filling the second via hole with metal and forming a coupling patch on a top surface of the third insulating layer.

13. The method of claim 12, wherein the forming of the connection patch includes:
    depositing a metal material on the first insulating layer and etching the metal material to form a ring patch located on an upper periphery of the drill hole together with the metal layer and the first radiation patch; and
    forming a hole patch for covering a center of the ring patch on a top surface of the drill hole.

14. The method of claim 12, wherein the forming of the first via hole and the forming of the second via hole include defining the first via hole and the second via hole by penetrating the second insulating layer and the third insulating layer using a laser, respectively.

15. The method of claim 12, comprising:
    before the forming of the first via and the second radiation patch,
    stacking a fourth insulating layer on a bottom surface of the first insulating layer; and
    defining a third via hole in the fourth insulating layer,
    wherein forming of a third via by filling the third via hole with metal is performed together with the forming of the first via and the second radiation patch.

16. A mobile terminal comprising:
    a display unit;
    a housing for mounting the display unit on a front surface thereof;
    an antenna module integrally formed with the display unit; and a wireless communication unit configured to control to transmit and receive a signal through the antenna module, wherein the antenna module includes:
- a first radiation patch having a first opening defined therein;
- a second radiation patch spaced upwardly apart from the first radiation patch, wherein the second radiation patch is smaller than the first radiation patch and has a second opening defined therein;
- a coupling patch spaced upwardly apart from the second radiation patch, wherein the coupling patch is smaller than the second radiation patch; and
- a feeding path connected to the coupling patch through the first opening and the second opening, wherein a center of the first opening and a center of the second opening are displaced in a lateral direction.

17. The mobile terminal of claim 16, wherein the feeding path includes:
- a first path upwardly extending in a vertical direction to the first opening;
- a second path extending from the first opening through the second opening to the coupling patch, wherein the second path is displaced from the first path; and
- a connection patch located within the first opening, wherein a bottom surface of the connection path is connected to the first path, and a top surface of the connection path is connected to the second path.

18. The mobile terminal of claim 17, further comprising:
- a first insulating layer penetrated by the first path, wherein the first radiation patch and the connection patch are positioned on a top surface of the first insulating layer;
- a second insulating layer stacked on a top surface of the first insulating layer, wherein the second radiation patch is located on one surface of the second insulating layer; and
- a third insulating layer located on a top surface of the second insulating layer, wherein the coupling patch is located on one surface of the third insulating layer, wherein the second path penetrates the second insulating layer and the third insulating layer.

19. The mobile terminal of claim 18, wherein the first path includes a metal layer coated on an inner side surface of a drill hole defined in the first insulating layer, wherein the connection patch is connected to the metal layer and covers a top surface of the drill hole.

20. The mobile terminal of claim 18, wherein the second path includes a via formed by filling metal in a first via hole defined in the second insulating layer and a second via hole defined in the third insulating layer.

* * * * *